(12) United States Patent
Pogatzki et al.

(10) Patent No.: US 8,112,792 B2
(45) Date of Patent: Feb. 7, 2012

(54) NETWORK NODE AND METHOD FOR PROVIDING INTERNET SERVICES ON INTERNET MARKETPLACES

(75) Inventors: Martin Pogatzki, Berlin (DE); André Stebens, Düsseldorf (DE); Harald Werner, Mannheim (DE)

(73) Assignee: Deutsche Post AG, Bonn (DE)

(*) Notice: Subject to any disclaimer, the term of this patent is extended or adjusted under 35 U.S.C. 154(b) by 800 days.

(21) Appl. No.: 11/910,506

(22) PCT Filed: Mar. 10, 2006

(86) PCT No.: PCT/EP2006/002250
§ 371 (c)(1),
(2), (4) Date: Oct. 2, 2007

(87) PCT Pub. No.: WO2006/105852
PCT Pub. Date: Oct. 12, 2006

(65) Prior Publication Data
US 2008/0123667 A1 May 29, 2008

(30) Foreign Application Priority Data
Apr. 4, 2005 (EP) .................................. 05007296

(51) Int. Cl.
*G06F 17/00* (2006.01)
(52) U.S. Cl. .................... 726/8; 726/28; 726/29; 726/2; 705/64; 705/44
(58) Field of Classification Search .................. None
See application file for complete search history.

(56) References Cited

U.S. PATENT DOCUMENTS

| | | | | |
|---|---|---|---|---|
| 2002/0107752 A1* | 8/2002 | Rivera et al. | ..................... | 705/26 |
| 2002/0152133 A1* | 10/2002 | King et al. | ..................... | 705/26 |
| 2003/0036966 A1 | 2/2003 | Amra et al. | | |
| 2004/0062255 A1 | 4/2004 | Grandemange et al. | | |
| 2006/0143089 A1* | 6/2006 | Jain et al. | ......................... | 705/21 |

FOREIGN PATENT DOCUMENTS

| | | |
|---|---|---|
| EP | 1041491 | 10/2000 |
| EP | 1124192 | 8/2001 |

OTHER PUBLICATIONS

PCT International Preliminary Report on Patentability, PCT/EP2006/002250, Mar. 10, 2006, English Translation.
PCT Preliminary Report on Patentability, Jun. 28, 2007, PCT.

* cited by examiner

*Primary Examiner* — Nasser Moazzami
*Assistant Examiner* — Fikremariam A Yalew
(74) *Attorney, Agent, or Firm* — International IP Law Group, PLLC

(57) ABSTRACT

A network node provides an Internet service executed in a server for Internet marketplace users. An outer connector receives a request initiated in a user computer, and transmits to the user computer a result from the provider server. The service is requested via an Internet marketplace website on a server connected to the user computer. The outer connector is adapted to change the format of the request and the result for the Internet marketplace. A transformation unit is connected to the outer connector, and adapted to ascertain a provider server for the service based on the request, and addressing the request to the provider server. The node comprises a unit adapted to verify user authorization to access the service, based on an Internet marketplace profile. An inner connector is connected to the transformation unit for transmitting the request to, and receiving the result from, the provider server.

25 Claims, 1 Drawing Sheet

NETWORK NODE AND METHOD FOR PROVIDING INTERNET SERVICES ON INTERNET MARKETPLACES

CROSS REFERENCE TO RELATED APPLICATIONS

Pursuant to 35 U.S.C. §371, this application is the United States National Stage Application of International Patent Application No. PCT/EP2006/002250, filed on Mar. 10, 2006, the contents of which are incorporated by reference as if set forth in their entirety herein, which claims priority to EP Patent Application No. 05007296.6, filed Apr. 4, 2005, the contents of which are incorporated by reference as if set forth in their entirety herein.

BACKGROUND

The invention relates to a network node and to a method for providing at least one Internet service of a service provider for users of an Internet marketplace.

In order to provide Internet services, as a rule, applications are used that are executed on an Internet server of a service provider. The applications are called by a customer of the service provider in the form of a request via a website that is provided by the service provider.

When Internet services of the service provider are made available on one or more Internet marketplaces that are operated by another marketplace operator, the problem often exists that an adaptation of the Internet services of the service provider to the Internet marketplace is very complex. This especially results from the fact that as a rule, differently configured data records have to be provided for different Internet marketplaces, for example, data records having different data formats for requesting the Internet services in order to provide the results of the executed Internet services.

U.S. patent application US 2002/107752 discloses a system and a method to integrate web-oriented orders into a back-end business system in which buyer and seller systems are connected via adapters to a data manager. On the basis of a form, a buyer transmits a purchase order in a buyer-specific format to the data manager. The form can be sent directly or via adapter modules to the data manager or else it can be provided via a browser-supported interface. The data manager translates the purchase order into a neutral format and stores it in a central database where it is linked to a buyer. Then the purchase order is transmitted to the back-end system of the seller, whereby it is translated into a seller-specific format.

U.S. patent application US 2004/062255 discloses a system and a method for communicating in a computer network, especially for carrying out reservations. Here, a client is connected via a multiplexing unit to a server or several servers that offer a service. Service requests of the client are converted within the multiplexing unit into the format that is needed by an application program of the server. Moreover, the service requests are transmitted by the multiplexing unit to the servers on the basis of the load distribution.

Moreover, U.S. patent application US 2003/036966 describes a system and a method integrating an e-commerce application into a back-end system of a goods provider, in which formats of messages that are exchanged between the e-commerce application and the back-end system are converted in an integration node. Thus, the purchase order of a customer that is received from the e-commerce application is incorporated into an XML message. Its format is converted in the integration node into the format used by the back-end system and it is transmitted to this system.

SUMMARY OF THE INVENTION

It is an objective of the invention to be able to provide Internet services on Internet marketplaces in a simple manner and, in this process, especially to minimize the requirements involved in connecting Internet marketplaces to the data processing systems of a service provider that serve to execute the Internet services.

According to the invention, the network node for providing at least one Internet service that is executed in at least one provider server of a service provider for users of an Internet marketplace comprises at least one outer connector for receiving a service request whose generation can be initiated in a user computer of an Internet marketplace user and for transmitting to the user computer a processing result ascertained in the provider server, whereby the outer connector is capable of making a format change to the service request and to the processing result, as an adaptation to the Internet marketplace, a transformation unit connected to the outer connector for ascertaining at least one provider server for executing the service on the basis of information contained in the service request and for addressing the service request to the ascertained provider server, and at least one inner connector connected to the transformation unit for transmitting the service request to the provider server and for receiving the processing result ascertained in the provider server from said provider server.

Within the scope of the invention the term Internet marketplace is to be understood in its broadest sense and comprises particularly web portals such as, for example, auction portals, exchanges or discussion forums in the Internet as well as websites that are provided, for instance, by online shops.

The network node allows Internet services provided by a service provider to be made available on an Internet marketplace without the provider servers that execute the Internet services having to be adapted to the Internet marketplace. The interpretation of the service request—that is to say, especially the making of necessary format changes, the ascertainment of the provider server needed for the execution of the service, and the addressing of the service request to the provider server—takes place in the network node so that the information needed to execute the Internet service can be acquired in a marketplace-specific manner and can be incorporated into the service request, without an adaptation to the requirements of the provider server already having to be made by the Internet marketplace.

Moreover, the interface between the network node and the Internet marketplace is uncoupled from the interface between the network node and the provider server, which translates into an especially great flexibility during the adaptation of the transformation node.

Owing to the outer connectors, it is advantageously achieved that the network node itself can be adapted in a simple and flexible manner to an Internet marketplace and especially to a data format used for the communication with an Internet marketplace, without changes to the inner functionality of the network node, that is to say, especially adaptations of the transformation unit, being needed during the adaptation.

Here, the outer connector can preferably be connected to the network node by means of a connector slot, whereby the outer connector can be connected to the network node and can be disconnected from the network node during the ongoing operation of the network node.

Hence, uninterrupted operation of the network node is possible while an outer connector is either connected to the network node or disconnected from it. Moreover, adaptations of an outer connector can be made during the ongoing operation of the network node in that the outer connector that is to be adapted is disconnected from the network node, adapted, and then connected to the network node again.

In a preferred embodiment of the invention, it is provided that the outer connector is connected to at least one user computer, whereby the user computer is connected to a marketplace server.

In a preferred embodiment of the invention, as a function of the processing result ascertained in the provider server, the transformation unit generates a notification about the processing result, and the processing result is then transmitted from the outer connector to the marketplace server.

In this manner, information about the utilization of the Internet service by a marketplace user can be transmitted to the marketplace server. Advantageously, this also makes it possible for the processing result ascertained in the provider server to be transmitted to the user computer indirectly via the marketplace server.

In an advantageous embodiment of the invention, the inner connector of the network node is capable of making a format change to the service program call and to the processing result.

An adaptation of the network node to the provider server or to the service program executed in the provider server can thus be made in a simple manner by means of an adaptation of the inner connector, without a need for adaptations of the inner functionality of the network node and especially of the transformation unit.

The inner connector can preferably be connected to the network node by a connector slot, whereby the inner connector can be connected to the network node and can be disconnected from the network node during the ongoing operation of the network node.

Thus, during the operation of the network node, it is possible to connect inner connectors to the network node and to disconnect inner connectors from the network node. In particular, this also means that adaptations of inner connectors can be made during the ongoing operation of the network node in that the outer connector that is to be adapted is disconnected from the network node, adapted and then connected to the network node again.

In an advantageous embodiment of the invention, the network node comprises an authentication and authorization unit for verifying the authorization of the Internet marketplace user to access the Internet service.

By means of the authentication and authorization unit, the authorization of the Internet marketplace user can already be verified in the network node. Moreover, the access authorization can be verified for several Internet services of the provider server so that a so-called single sign-on, that is to say, a central authorization for several services, is made possible.

In a preferred embodiment of the invention, it is provided that the verification of the authorization of the Internet marketplace user to access the Internet service is carried out on the basis of a marketplace authorization profile associated with the Internet marketplace and/or on the basis of a user authorization profile associated with the Internet marketplace user.

The extent to which a user of the Internet marketplace can make use of Internet services of the service provider can be verified or ascertained on the basis of the authorization profiles. Here, the authorization profile can be defined so as to be marketplace-specific and/or user-specific, so that different authorizations for making use of an Internet service can be stipulated for different Internet marketplaces and for different users of the Internet marketplaces.

Preferably, the service request contains information that is encrypted using a key that is unambiguously associated with the Internet marketplace and that can be decrypted in the authentication and authorization unit.

Consequently, the authenticity of the service request can be ascertained on the basis of the information that is encrypted using a key that is unambiguously associated with the Internet marketplace.

In another preferred embodiment of the invention, it is provided that the user authorization profile is contained in the service request.

Therefore, by incorporating the user authorization profile into the service request, which is preferably done by the Internet marketplace, the extent to which a user of the Internet marketplace can make use of Internet services of the service provider can be indicated in the service request.

Preferably, it is provided here that the user authorization profile is encrypted using a key that is unambiguously associated with the Internet marketplace or is furnished with a digital signature of the Internet marketplace.

In this manner the authenticity of the user authorization profile can be verified in the network node.

In another advantageous embodiment of the invention, it is provided that the authentication and authorization unit can change the user authorization profile as a function of the processing result ascertained in the provider server.

In this manner, the authorization profile of an Internet marketplace user can be changed as a function of his making use of a certain Internet service of the service provider.

Preferably, it is provided here that the authentication and authorization unit can change the user authorization profile as a function of a number of processing results ascertained for a marketplace user.

In another advantageous embodiment of the invention, the network node comprises a verification unit for verifying the processing result ascertained in the provider server.

Preferably, the verification unit is capable of verifying the completeness of the processing result.

Hence, the verification unit can ascertain the correctness and completeness of the processing result. If an error is found in the processing result, this can be used, for example, to generate notifications about the presence of an error within the network node and to transmit said notifications to the user computer of the Internet marketplace user.

In another advantageous embodiment of the invention, it is provided that the network node has a reporting unit for acquiring and evaluating the service requests and the processing result.

The method for providing at least one Internet service that is executed in at least one provider server of a service provider for users of an Internet marketplace comprises the following steps:
  receiving in an outer connector of a network node a service request initiated in a user computer,
  making format changes to the service request in the outer connector,
  ascertaining a provider server on the basis of information contained in the service request, and addressing the service request to the provider server,
  transmitting the service request to the provider server, ascertaining a processing result in the provider server and transmitting the processing result to the network node and receiving the processing result in the network node and transmitting the processing result to the user computer.

Advantageous refinements of the invention regarding the method correspond to the embodiments of the invention described in conjunction with the network node.

DETAILED DESCRIPTION OF SPECIFIC EMBODIMENTS

Figure 1:
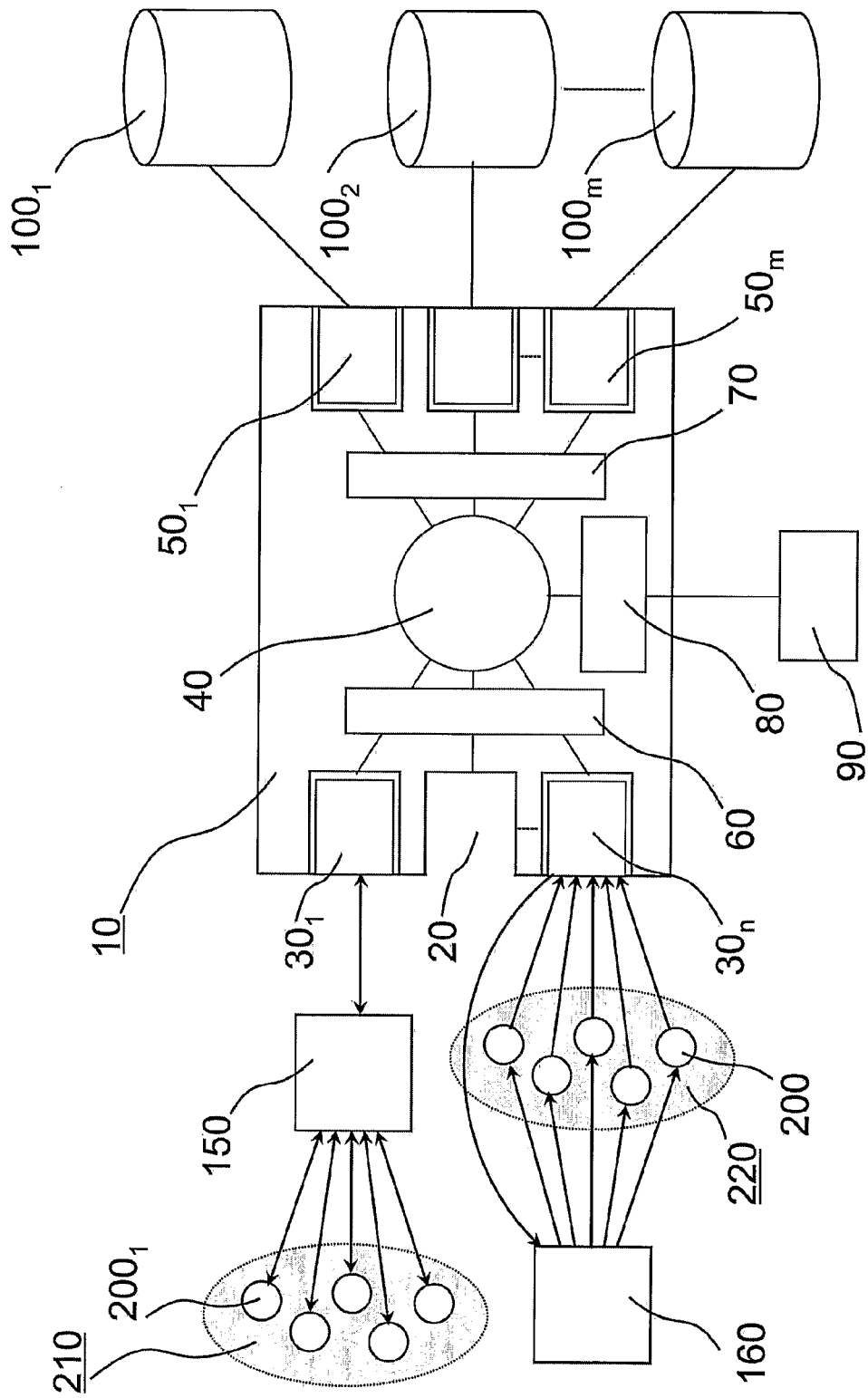
FIG. 1 shows a schematic depiction of an embodiment of the network node 10 according to an exemplary embodiment of the present invention with connected Internet marketplaces and provider servers $100_1, \ldots, 100_m$ for executing service programs.

The invention will be explained on the basis of the embodiment of a network node 10 that will be referred to below as a transformation node.

Via the Internet, the transformation node 10 is connected to several Internet marketplaces. By way of an example, FIG. 1 shows connections to two Internet marketplaces that are implemented in different embodiments.

In one of the cases shown, the transformation node 10 is connected to a marketplace server 150 of an Internet marketplace which users of the marketplace access by means of the user computers 200. The group of user computers 200 of the marketplace users is designated with the reference numeral 210 in FIG. 1. A direct connection between the user computers 200 and the transformation node 10 does not exist here, so that the data exchange between the user computers 200 and the transformation node 10 takes place via the marketplace server 150. Such an Internet marketplace is referred to below as a transit marketplace and the marketplace server 150 of such an Internet marketplace is referred to as a consolidator source.

In another depicted case, the user computers 200 are connected to the transformation node 10 as well as to the marketplace server 160, so that a data exchange can take place directly between the computers 200 and the transformation node 10. An Internet marketplace configured in this manner is referred to below as an area marketplace and the marketplace server 160 of such an Internet marketplace is referred to as a distribution source. In this case, the group of the user computers 200 of the marketplace users, is designated with the reference numeral 220.

In the case of the transit marketplace and in the case of the area marketplace, the access to the Internet marketplace takes place via the Internet by means of a website of the Internet marketplace that is provided by the marketplace server 150, 160 and by means of a browser program that is executed in the user computers 200 and displayed on a display means of the user computers 200.

In an advantageous embodiment of the invention, the transformation node 10 contains outer connectors 30 that, in the case of the transit marketplace, are connected to the consolidator source 150 and, in the case of the area marketplace, are connected to the user computers 200 via a communication network, preferably the Internet. The outer connectors $30_1, \ldots, 30_n$, are plugged into connector slots 20 of the transformation node 10.

Within the transformation node 10, there is a connection between the outer connectors $30_1, \ldots, 30_n$ and an authentication and authorization unit 60 which, in turn, is connected to the transformation unit 40. For purposes of establishing a direct data transmission between the outer connectors $50_1, \ldots, 50_m$ and the transformation unit 40, the authentication and authorization unit 60 can be bridged.

The transformation unit 40 is connected to a verification unit 70 which, in turn, is connected to inner connectors $50_1, \ldots, 50_m$. Here, too, a direct connection between the transformation unit 40 and the inner connectors $50_1, \ldots, 50_m$ can be established by means of which the verification unit 70 is bridged. The inner connectors $50_1, \ldots, 50_m$ are likewise plugged into connector slots of the transformation node 10 and they connect the transformation node 10 to servers $100_1, \ldots, 100_m$ on which service programs for executing Internet services are executed.

Moreover, the transformation node 10 comprises a control and reporting unit 80 for administering the transformation node 10 and for logging purposes.

The transformation node 10 can be configured as hardware or as software. In an advantageous embodiment of the invention, it is implemented in the form of several software modules that are executed in an Internet server.

The users of an Internet marketplace are offered Internet services that are made available by a service provider that can be independent of the marketplace operator. Service programs for executing the Internet services are each provided on at least one provider server $100_1, \ldots, 100_m$ that is operated by the service provider. In an advantageous use of the invention, which will be elaborated upon in greater detail below, the Internet services are franking and logistic services that allow, for example, the generation of electronic postage indicia, the generation of address labels for the shipping of mailpieces, or else the tracking of shipments, all of which are offered by a logistics service provider.

The request for the Internet services is initiated directly or indirectly on a website of the Internet marketplace, for example, by actuating a button located on the website. The invention makes it possible for an Internet service not to be requested on a website of the service provider but rather directly on the website of the Internet marketplace. In particular, websites that might be displayed during the execution of the service as a processing result or as a partial processing result, can also be adapted to the layout of the websites of the Internet marketplace in a simple manner by the transformation node 10.

The generation of a service request is associated with the call of the Internet service on the website of the Internet marketplace, and this service request especially contains information about the execution of the Internet service. This information is, for example, user data of the marketplace user who can enter this data into a dialog field of the website or else it is data that is stored in a database of the marketplace operator. Moreover, the service request contains identification data of the Internet marketplace and comprises at least one instruction that allows the transformation node 10 to identify the requested Internet service. This instruction can also be contained implicitly in the service request. Thus, for example, it can be provided that the requested Internet service or the provider server $100_1, \ldots, 100_m$ provided for the execution of the Internet service is identified in the transformation node 10 on the basis of the type of information contained in the service request.

In case of the area marketplace, the service request is generated by scripts incorporated into a website and transmitted directly from the user computer 200 to the transformation node 10 via the Internet. In the case of a transit marketplace, the service request can either be generated by scripts in the website of the Internet marketplace and transmitted by the user computer 200 to the transformation node 10 via the consolidator source 150, or else it can be generated after the transmission of a request transport this effect from the user computer 200 to the consolidator source 150 within the consolidator source 150.

By the same token, in the case of a transit marketplace, the service request can be generated by a script with the browser program of the user computer 200 and augmented by the consolidator source 150, for example, by identification information of the Internet marketplace, by user data stored in a database of the consolidator source 150 or by marketplace and/or user authorization profiles stored in the database of the consolidator source 150. In the case of an area marketplace, such information is incorporated into the service request by a functionality of the scripts contained in the website of the Internet marketplace.

Moreover, it is possible for a single service request to contain a request of several Internet services.

The connection between the transformation node 10 and an Internet marketplace is established via an outer connector $30_1, \ldots, 30_n$ that is individually adapted to the Internet marketplace. In the outer connectors $30_1, \ldots, 30_n$, especially format changes are made to the service request and to the processing results, which will be described below and which are ascertained in the provider servers.

These are static format changes that are made independently of the content of the service request. Examples of such format changes are conversions of protocol formats such as, for example, a conversion of EDIFACT documents into XML documents and vice versa, as well as changes to character set encodings and changes to field designations and field sequences in the service request. Thus, for example, it is possible to convert data records such as, for example, user data, whose format is oriented towards the requirements of the marketplace server 150, 160 such as, for instance, a specific database format used in the marketplace server 150, 160.

Through the possibility of a format change in the outer connectors $30_1, \ldots, 30_n$, it can be ensured that changes relating to the communication between the transformation node 10 and an Internet marketplace do not exert any effect on the inner functionality of the transformation node 10 or any effect on the configuration of the provider servers $100_1, \ldots, 100_m$ or on the service programs executed on the provider servers $100_1, \ldots, 100_m$.

In order to connect a plurality of Internet marketplaces, the transformation node 10 has a plurality of connector slots 20 to receive outer connectors $30_1, \ldots, 30_n$. Here, it is possible to insert and remove outer connectors $30_1, \ldots, 30_n$ during the ongoing operation of the transformation node, so that uninterrupted operation of the transformation node 10 is possible when an Internet marketplace is added or removed. In case of changes that are made to an outer connector $30_1, \ldots, 30_n$ the latter can likewise be removed, adapted and inserted again during the activated state of the transformation node 10 so that here, too, no interruption of the operation of the transformation node 10 is necessary.

A service request is received by the transformation node 10 at the outer connector $30_1, \ldots, 30_n$ that is associated with the corresponding Internet marketplace, and, if applicable, a format change of the above-mentioned type is made. There is fundamentally no difference in terms of the different types of marketplaces.

From an outer connector $30_1, \ldots, 30_n$, the service request is transferred within the transformation node 10 to an authentication and authorization unit 60 which, in an authentication step, first verifies whether Internet services of the service provider are fundamentally allowed to be used. The authentication takes place here on the basis of the identity of the Internet marketplace and/or on the basis of the identity of the marketplace user.

The authentication is made on the basis of authentication information that is contained in the service request and whose authenticity is ensured by the use of cryptographic methods. Suitable cryptographic methods are, for example, digital signatures of the service request or of part thereof. It is likewise possible that contents of the service request are encrypted using a key associated with the Internet marketplace or with the marketplace user (asymmetrical encryption with certified keys) or with a symmetrical key that was exchanged ahead of time between the transformation node 10 and the Internet marketplace or the marketplace user (symmetrical encryption with a "pre-shared key").

If a successful authentication is not possible, this means that this is not an authentic service request by the user of a registered Internet marketplace or that, for other reasons, the marketplace user is not authorized to make use of Internet services of the service provider. In this case, the authentication and authorization unit 60 generates an error message that is transmitted to the user computer 200 via the outer connector $30_1, \ldots, 30_n$. Moreover, a logging of the service request can be provided by means of the control and reporting unit 80, which will be explained below.

After a successful authentication, in an authorization step, the authentication and authorization unit 60 ascertains the authorization of the marketplace user to make use of Internet services. Here, it is checked which Internet services the marketplace user can use and the extent of such use. This likewise takes place on the basis of the identity of the Internet marketplace and/or of the identity of the marketplace user.

The authorization of an Internet marketplace is made on the basis of a marketplace authorization profile that is preferably stored in the authentication and authorization unit 60. The marketplace authorization profile contains information about the extent to which users of the marketplace can use Internet services, that is to say, which functions within the Internet service can be executed by users of the marketplace.

The marketplace user is preferably authorized on the basis of a user authorization profile contained in the service request, which is likewise cryptographically secured. The user authorization profile is preferably incorporated into the service request on the part of the Internet marketplace by the marketplace server 150, 160 or by a script embedded into the website of the Internet marketplace, or else it is stored in a database in the transformation node 10. The user authorization profile indicates the extent to which the user can utilize Internet services of the service provider. In this manner, the marketplace operator can provide the users of the Internet marketplace with different access rights for the Internet services of the service provider.

Functions available within the Internet service or the extent to which the Internet service can be utilized relate, for example, to various payment possibilities for utilizing the Internet service, to the possibility of storing data on the provider server $100_1, \ldots, 100_n$ for purposes of reusing it at the time of another access as well as to the size of the storage space available for this and other additional services that are offered within the scope of the Internet service.

In order to carry out the authorization, the authentication and authorization unit 60 verifies on the basis of the marketplace authorization profile and/or the user authorization profile whether and to what extent the marketplace user is authorized to utilize the requested Internet service or services. If the verification indicates that the marketplace user does not have authorization to utilize the requested Internet service or services, preferably an error message is generated and transmitted to the user computer 200 of the marketplace user via the outer connector 30₁, ..., 30ₙ.

If the requested Internet services can only be identified after the service request has been evaluated in the transformation unit 40, the authentication and authorization unit 60 transfers the marketplace authorization profile or the user authorization profile to the transformation unit 40. In this case as well, however, it is possible to verify within the authentication and authorization unit 60 whether the marketplace user is fundamentally authorized to utilize Internet services of the service provider, whereby an error message is generated and transmitted to the user computer 200 of the marketplace user if this is not the case.

If several Internet services are requested with the service request, the authentication and authorization in the authentication and authorization unit 60 constitutes a central login (single sign-on) of the marketplace user for the various Internet services.

The transformation unit 40 receives the service request, optionally together with the ascertained authorization information, from the authentication and authorization unit 60. Depending on the content of the service request and optionally depending on the authorization information ascertained in the authentication and authorization unit 60, the service request is converted by the transformation unit 40. Since the conversion, in contrast to the static format change that is made in the outer connectors 30₁, ..., 30ₙ, is carried out as a function of the content of the service request, it is referred to here as an intelligent conversion.

In the transformation unit 40, processes are executed for purposes of intelligent conversion and they allow the service request to be forwarded to the applicable service program executed on one of the provider servers 100₁, ..., 100ₘ. If several Internet services are requested with one service request, then, for each of the services, the service request or the applicable part of the service request is forwarded to a provider server 100₁, ..., 100ₘ in the manner described below.

The transformation unit effectuates a so-called routing of the service request, that is to say, depending on its content, the provider server 100₁, ..., 100ₘ is ascertained on which the service program for executing the requested Internet service is executed, and the service request is addressed to this provider server 100₁, ..., 100ₘ. Moreover, other intelligent conversions are carried out such as, for instance, a change and augmentation of data contained in the service request.

The intelligent conversions can also be, for example, corrections that arise after plausibility checks or after the application of parsing rules, that is to say, rules for interpreting the service request. For example, in the case of an Internet service for generating address labels, if post office box information is detected in a data field that is intended for the name of the street, then this can be corrected by the transformation unit 40.

By the same token, within the scope of the intelligent conversion, the service requests can be changed in such a way that, instead of the requested Internet service, a more up-to-date, improved or less expensive service is executed (for example, within the scope of a special sale).

Moreover, in a preferred embodiment of the invention, so-called dynamic routing is provided with which the availability of the provider server 100₁, ..., 100ₘ is ascertained and the service request is addressed to a provider server 100₁, ..., 100ₘ for which the availability has been ascertained. Moreover, it can also be provided that, by means of the transformation unit 40, a so-called load balancing is carried out with which, in addition to the availability, also the capacity utilization of the provider server 100₁, ..., 100ₘ is ascertained and the service request is transmitted to the provider server 100₁, ..., 100ₘ with the lowest capacity utilization.

After the processing in the transformation unit 40, the service request is transmitted either via a verification unit 70 or else directly to the inner connector 50₁, ..., 50ₘ that is connected to the ascertained provider server 100₁, ..., 100ₘ.

In a preferred embodiment of the invention, it is also provided that, together with the service request, authentic additional information, for example, encrypted information, is transmitted from the transformation unit 40 to the provider server 100₁, ..., 100ₘ. The additional information here is decrypted in the provider server 100₁, ..., 100ₘ using a key that is unambiguously associated with the transformation unit 40 or with the transformation node 10, in order to check whether the service request comes from the transformation node 10. Consequently, additional authentication and/or authorization of the marketplace user in the provider server 100₁, ..., 100ₘ are not necessary in this embodiment of the invention.

The inner connectors 50₁, ..., 50ₘ are capable of making static format changes to the service program call and are connected via connector slots to the transformation node 10 into which, during the ongoing operation, inner connectors 50₁, ..., 50ₘ can be plugged and from which, during the ongoing operation, inner connectors 50₁, ..., 50ₘ can be unplugged.

On the basis of the mode of operation of the inner connectors 50₁, ..., 50ₘ, when the service programs are being adapted to the provider servers 100₁, ..., 100ₘ, only an adaptation of the inner connectors 50₁, ..., 50ₘ is needed but not an adaptation of the transformation unit 40. Moreover, such adaptations can also be made during the ongoing operation of the transformation node 10 in that the affected inner connectors 50₁, ..., 50ₘ are unplugged during the adaptation.

Via the inner connectors 50₁, ..., 50ₘ, the service request is transmitted to the ascertained provider server 100₁, ..., 100ₘ. This is preferably done via a network such as the Internet or—if the transformation node 10 is operated by the service provider itself—via an internal data network of the service provider.

After the service request has been processed in the service program executed on the provider server 100₁, ..., 100ₘ, that is to say, after the execution of the service, the provider server 100₁, ..., 100ₘ sends the processing result, i.e. the data ascertained in the provider server 100₁, ..., 100ₘ during the execution of the Internet service or of the service program, back to the transformation node 10 where it is, in turn, received by the inner connector 50₁, ..., 50ₘ.

After the receipt and after the execution of any format changes that might have to be made within the inner connector 50₁, ..., 50ₘ, the processing result is transferred to the verification unit 70 in which a formal verification of the processing result is carried out. In this context, it is verified whether the processing result is complete and formally correct. As far as the completeness is concerned, for example, if a marketplace user requests a digital postage indicium, it is checked whether the processing result comprises a printable copy or a print preview of the postage indicium. The criteria for the verification relating to the processing results of the various provider servers 100₁, ..., 100ₘ are stored in a database of the transformation node 10.

If completeness or correctness are not present, then instead of the processing result or in addition to the processing result, a notification indicating the error is transmitted to the user computer 200 of the marketplace user.

The verification unit 70 is also capable of checking the availability of the provider servers $100_1, \ldots, 100_m$ and of providing the result to the transformation unit so that the latter can effectuate the described dynamic routing of service requests on the basis of the verification results.

Within the transformation node 10, the checked processing result is forwarded either via the transformation unit 40 or else bypassing the transformation unit 40 to the outer connector $30_1, \ldots, 30_n$ that is connected to the Internet marketplace from which the service request originally came.

Further processing of the processing result in the transformation node 40 is necessary if an intelligent processing of the processing result is supposed to be carried out in addition to the forwarding of the processing result to the user computer 200 of the marketplace user or to the consolidator source 150.

Here, for example, it can be provided that, in case of an area marketplace, in addition to the transmission of the processing result to the user computer 200 or instead of the transmission of the processing result to the user computer 200, a notification about the processing result or about the utilization of the service is transmitted to the distribution source 160. This notification is generated in the transformation unit. The subject matter of the notification can be, for instance, information about the fact that a certain marketplace user has utilized a certain Internet service. In this manner, the result of the service can also be transmitted from the distribution source 160 to the user computer 200.

After the optional processing of the processing result by the transformation unit 40, this result is sent either via the authentication and authorization unit 60 or else bypassing this unit to the outer connector $30_1, \ldots, 30_m$ that is connected to the corresponding Internet marketplace.

In an advantageous embodiment of the invention, it is provided that the user authorization profile can be changed in the authentication and authorization unit 60 as a function of the processing result.

Thus, for example, within the scope of a "frequent user program", expanded authorizations can be assigned to marketplace users who frequently make use of certain Internet services, for which purpose the authentication and authorization unit 60 ascertains the number of processing results transmitted to a given marketplace user.

The outer connector $30_1, \ldots, 30_m$ makes the necessary format changes that correspond to the format change during the processing of the service request in the outer connector $30_1, \ldots, 30_n$ or that is specified independently thereof. Moreover, various format changes are made to the distribution source 160 pertaining to the processing result and to the notification ascertained from the processing result.

Furthermore, graphic adaptations can be made to the processing result within the scope of a conversion of the processing result in the transformation unit 40 or within the scope of the format change in the outer connector $30_1, \ldots, 30_m$, so that said processing result can be adapted to the layout of the marketplace. This can be done especially if the processing result is a website containing certain information.

Finally, the outer connector $30_1, \ldots, 30_m$ transmits the processing result to the computer 200 of the marketplace user from which the service request stems or to the consolidator source 150 of a transit marketplace and, optionally, additionally to the distribution source 160 of an area marketplace.

A control and reporting unit 80 that is operated by an administrator is provided for administering and monitoring the transformation node 10. One or more external data processing devices 90 can be connected to the control and reporting unit 80 for purposes of evaluating utilization data of the transformation node 10.

By means of the control and reporting unit 80 the rules for the format change in the inner connectors $50_1, \ldots, 50_m$, the rules for the authentication and authorization unit 60, the rules for the intelligent conversion in the transformation unit 40 and the criteria for the verification of the processing results in the verification unit 70 can be specified. Furthermore, the control and reporting unit 80 is able to ascertain the utilization of the transformation node 10 and of the connected provider servers $100_1, \ldots, 100_m$ by the users of the Internet marketplaces and to make this available in the form of access tables and statistics for evaluation and invoicing purposes. All administration and evaluation tasks can also be performed via the connected data processing devices 90.

Moreover, especially comparisons between the point in time when a service request is received in the transformation node 10 and the point in time when the processing result is sent out by the transformation node 10 can be carried out in order to ascertain the processing duration and to check compliance with availability commitments in individual cases and statistically. For this purpose, the necessary information for the evaluation is transmitted from the transformation unit 40 to the control and reporting unit 80 and this information is evaluated there or else in the data processing devices 90.

A possible application scenario for the invention relates to the provision of franking and logistics services that are made available by a logistics company to users of an auction portal in which goods are sold at auction by a seller to a buyer within the scope of auctions. As a rule, the seller ships the auctioned goods by mail to the buyer.

Within the scope of the invention, for example, the following Internet services can be offered to the sellers who participate in the auction portal:

an Internet service for generating digital postage indicia that the seller can print out on his user computer 200,
an Internet service for generating address labels for shipping the auctioned goods,
Internet services for ascertaining a product of the logistics company that is suitable for sending the shipment and for finding postal codes,
an Internet service for tracking the shipments that have been sent out.

When a seller is participating in an auction, he can initiate the franking of a mailpiece directly on the website of the auction portal in order to ship the article that has been sold at auction.

For purposes of franking, an Internet service for generating digital postage indicia can be used in which process a printable copy of a cryptographically secured digital postage indicium is generated in the provider server $100_1, \ldots, 100_m$ and transmitted to the user computer 200 of the seller. This printable copy can be, for example, a PDF document that can be printed out using a printer that is connected to the user computer 200.

Here, for example, in order to use the franking service, the usual requirement to provide information such as the sender and recipient addresses, the desired product and print medium for the generation of the postage indicium can be dispensed with since all of this information is known within the auction portal or can be derived from known information. In fact, this is why this information is compiled within the auction portal and transmitted to the transformation node 10 in the service request. The transformation node 10 and especially the transformation unit 40 take over the intelligent conversion in such a manner that certain process steps can be skipped that would otherwise have to be carried out when the franking service is utilized. This simplifies and speeds up the process for the seller. Thus, for instance, the information about the recipient of the shipment, that is to say, about the buyer of the goods, can be taken from information that was acquired during the auction and that can be automatically incorporated into the service request for utilizing the franking service. The information about the sender can likewise be supplied by the Internet marketplace and automatically incorporated into the service request.

Within the scope of processing the service request in the transformation node 10, the following actions are carried out: a format change to the service request, an authorization to utilize the franking service or other services, the routing and an intelligent conversion as well as the forwarding of the service request to the provider server $100_1, \ldots, 100_m$ in which the franking service is performed.

Since, as a rule, an auction portal is an area marketplace, the processing result ascertained in the provider server $100_1, \ldots, 100_m$ is transmitted by the transformation node 10 directly to the user computer 200 of the seller. The verification unit 70 of the transformation node 10 checks, for example, whether the processing result ascertained in the provider server $100_1, \ldots, 100_m$ during the execution of the franking service contains the printable copy of the digital postage indicium.

Moreover, a notification about the execution of the franking service is generated and transmitted to the distribution source 160 of the auction portal. This can also serve, for example, so that information about the successful execution of the franking service can be displayed to the seller on the website of the auction portal.

Moreover, it is possible to generate access lists and statistics about the utilization of the franking and logistics services by users of the auction portal.

Finally, the transformation node serves to check the boundary conditions that have been agreed upon with the Internet marketplace for the provision of the services (Service Level Agreement, abbreviated SLA) and to report on and document any discrepancies. In this context, important aspects include, among other things, the availability of the provider servers $100_1, \ldots, 100_m$ (i.e. it has to be possible to process requests) and the processing time (i.e. processing results have to be on hand within a certain period of time).

LIST OF REFERENCE NUMERALS

10 transformation node
20 connector slot
30 outer connector
40 transformation unit
50 inner connector
60 authentication and authorization unit
70 verification unit
80 control and reporting unit
90 data processing device
100 provider server
150 consolidator source ("transit marketplace")
160 distribution source ("area marketplace")
200 user computer

What is claimed is:

1. A network node for providing at least one Internet service that is executed in at least one provider server of a service provider for users of an Internet marketplace, comprising:

at least one outer connector for receiving a service request whose generation can be initiated in a user computer of an Internet marketplace user and for transmitting to the user computer a processing result ascertained in the provider server, the Internet service being requested on a website of the Internet marketplace that is provided by a marketplace server connected to the user computer, the outer connector being adapted to make a format change to the service request and to the processing result, as an adaptation to the Internet marketplace;

a transformation unit connected to the outer connector, the transformation unit being adapted to ascertain at least one provider server for executing the Internet service on the basis of information contained in the service request and for addressing the service request to the ascertained provider server;

an authentication and authorization unit that is adapted to verify the authorization of the marketplace user to access the Internet service, the verification of the authorization of the marketplace user to access the Internet service being carried out on the basis of an identity of the Internet marketplace and of a marketplace authorization profile associated with the Internet marketplace so that different authorizations for using the Internet service can be stipulated for different Internet marketplaces; and at least one inner connector connected to the transformation unit for transmitting the service request to the provider server and for receiving the processing result ascertained in the provider server from said provider server.

2. The network node according to claim 1, wherein the outer connector is adapted to be connected to the network node via a connector slot, the outer connector being adapted to be disconnected from the network node during the ongoing operation of the network node.

3. The network node according to claim 1, wherein the outer connector is connected via a communication network to at least one user computer that is in turn connected via the communication network to a marketplace server (150, 160).

4. The network node according to claim 1, wherein the transformation unit generates a notification about the processing result as a function of the processing result ascertained in the provider server, the processing result being transmitted from the outer connector to the marketplace server.

5. The network node according to claim 1, wherein the inner connector is adapted to make a format change to the service request and to the processing result.

6. The network node according to claim 1, wherein the inner connector is adapted to be connected to the network node by a connector slot, and to be disconnected from the network node during the ongoing operation of the network node.

7. The network node according to claim 1, wherein the verification of the authorization of the marketplace user to access an Internet service is performed on the basis of the marketplace authorization profile associated with the Internet marketplace and on the basis of a user authorization profile associated with the marketplace user.

8. The network node according to claim 1, wherein the user authorization profile is contained in the service request.

9. The network node according to claim 1, wherein the user authorization profile is encrypted using a key that is unambiguously associated with the Internet marketplace or is furnished with a digital signature of the Internet marketplace.

10. The network node according to claim 1, wherein the authentication and authorization unit is adapted to change the user authorization profile as a function of the processing result ascertained in the provider server.

11. The network node according to claim 1, wherein the authentication and authorization unit is adapted to change the user authorization profile as a function of a number of processing results ascertained for a marketplace user.

12. The network node according to claim 1, comprising a verification unit that is adapted to verify the processing result ascertained in the provider server.

13. The network node according to claim 12, wherein the verification unit is adapted to verify whether the processing result is complete.

14. The network node according to claim 1, comprising a reporting unit that is adapted to acquire and evaluate the service requests and the processing result.

15. A method for providing at least one Internet service that is executed in at least one provider server of a service provider for users of an Internet marketplace, comprising:
    receiving in an outer connector of a network node a service request initiated in a user computer, the Internet service being requested on a website of the Internet marketplace that is provided by a marketplace server connected to the user computer;
    making format changes to the service request in the outer connector;
    ascertaining a provider server on the basis of information contained in the service request;
    addressing the service request to the provider server;
    verifying an authorization of the marketplace user to access an Internet service on the basis of an identity of the Internet marketplace and of a marketplace authorization profile associated with the Internet marketplace so that different authorizations for using the Internet service can be stipulated for different Internet marketplaces;
    transmitting the service request to the provider server;
    ascertaining a processing result in the provider server and transmitting the processing result to the network node;
    receiving the processing result in the network node; and
    transmitting the processing result to the user computer.

16. The method according to claim 15, wherein the outer connector is connected via a communication network to at least one user computer that is in turn connected via the communication network to a marketplace server.

17. The method according to claim 15, comprising
    generating a notification about the processing result as a function of the processing result ascertained in the provider server; and
    transmitting the notification about the processing result to the marketplace server.

18. The method according to claim 15, wherein the network node is connected to the provider server via an inner connector that is adapted to make a format change to the service request and to the processing result.

19. The method according to claim 15, wherein the authorization of the marketplace user to access an Internet service is carried out on the basis of a marketplace authorization profile associated with the Internet marketplace and/or on the basis of a user authorization profile associated with the marketplace user.

20. The method according to claim 15, wherein the service request contains encrypted information that is decrypted using a key that is unambiguously associated with the Internet marketplace.

21. The method according to claim 15, wherein the user authorization profile is contained in the service request.

22. The method according to claim 15, wherein the user authorization profile is encrypted using a key that is unambiguously associated with the Internet marketplace or is furnished with a digital signature of the Internet marketplace.

23. The method according to claim 15, wherein the user authorization profile is changed as a function of the processing result ascertained in the provider server ($100_1, \ldots, 100_m$).

24. The method according to claim 15, comprising changing the user authorization profile as a function of a number of processing results ascertained for a marketplace user.

25. The method according to claim 15, comprising verifying whether the processing result is complete.

* * * * *